United States Patent
Daido et al.

(10) Patent No.: US 7,094,497 B2
(45) Date of Patent: Aug. 22, 2006

(54) SEPARATOR FOR LITHIUM ION SECONDARY BATTERY

(75) Inventors: Takahiro Daido, Iwakuni (JP); Satoshi Igarashi, Iwakuni (JP); Satoshi Nishikawa, Iwakuni (JP); Hiroyuki Honmoto, Iwakuni (JP); Hiroyoshi Minematsu, Iwakuni (JP)

(73) Assignee: Teijin Limited, Osaka (JP)

( * ) Notice: Subject to any disclaimer, the term of this patent is extended or adjusted under 35 U.S.C. 154(b) by 299 days.

(21) Appl. No.: 10/180,968

(22) Filed: Jun. 27, 2002

(65) Prior Publication Data

US 2003/0017386 A1   Jan. 23, 2003

Related U.S. Application Data

(63) Continuation-in-part of application No. 09/959,538, filed on Oct. 29, 2001, now Pat. No. 6,818,352.

(30) Foreign Application Priority Data

Mar. 7, 1999 (JP) ............................. 2000-61674
Apr. 27, 2000 (JP) ............................. 2000-127309
Oct. 24, 2000 (JP) ............................. 2000-323795

(51) Int. Cl.
*H01M 2/16* (2006.01)

(52) U.S. Cl. ..................... 429/142; 429/249
(58) Field of Classification Search ................ 429/142, 429/300, 302, 249
See application file for complete search history.

(56) References Cited

U.S. PATENT DOCUMENTS

| | | | |
|---|---|---|---|
| 3,174,879 A | 3/1965 | Stanimirovitch | |
| 3,953,241 A | 4/1976 | Langer et al. | |
| 5,362,582 A | 11/1994 | Chang et al. | |
| 5,609,976 A * | 3/1997 | Ueda et al. ................. | 429/254 |
| 5,665,265 A * | 9/1997 | Gies et al. ................. | 252/62.2 |
| 5,681,357 A * | 10/1997 | Eschbach et al. .......... | 29/623.5 |
| 5,708,351 A | 1/1998 | Takamoro | |
| 5,721,067 A | 2/1998 | Jacobs et al. | |
| 5,834,135 A * | 11/1998 | Pendalwar et al. ......... | 429/303 |
| 6,194,874 B1 | 2/2001 | Kalegeropoulos | |
| 6,514,638 B1 | 2/2003 | Kurose et al. | |
| 6,579,648 B1 * | 6/2003 | Nakamizo et al. .......... | 429/249 |
| 2001/0004502 A1 | 6/2001 | Nakamizo et al. | |
| 2001/0004504 A1 | 6/2001 | Nakamizo et al. | |

FOREIGN PATENT DOCUMENTS

| | | |
|---|---|---|
| EP | 0 959 510 A2 | 11/1999 |
| EP | 1 191 622 A1 | 3/2002 |
| EP | 1 233 036 A1 | 8/2002 |
| GB | 2 357 896 | 7/2001 |
| JP | 51-137760 A1 | 11/1976 |
| JP | 05-62712 | 3/1993 |
| JP | 6-338347 | 6/1994 |
| JP | 07-153494 | 6/1995 |
| JP | 11-3731 | 1/1999 |
| JP | 11-045740 | 2/1999 |
| JP | 11-45742 | 2/1999 |
| JP | 2928779 | 5/1999 |
| JP | 2000-57847 | 2/2000 |
| JP | 2000-067917 | 3/2000 |
| JP | 3061756 | 4/2000 |
| JP | 3061759 | 4/2000 |
| JP | 2000-228215 | 8/2000 |
| JP | 2000-251932 | 9/2000 |
| JP | 3113652 | 9/2000 |
| JP | 2000-277147 | 10/2000 |
| JP | 2000-306610 | 11/2000 |
| JP | 2002-042867 | 2/2002 |
| JP | 2002-166218 A1 | 6/2002 |
| WO | WO-98/54778 A1 | 12/1998 |
| WO | WO-01/19906 A1 | 3/2001 |

OTHER PUBLICATIONS

Linden, "Handbook of Batteries, 3rd Editiion," pp. 35-4 to 35-5 (2002).
European Search Report Issued Dec. 16, 2003.

* cited by examiner

*Primary Examiner*—Stephen J. Kalafut
(74) *Attorney, Agent, or Firm*—Rader, Fishman & Grauer PLLC

(57) ABSTRACT

A separator, used for a lithium ion secondary battery that produces electromotive force by lithium doping/dedoping, which is composed of a porous film comprising an organic polymer (component A) which can swell in an electrolyte solution to retain it, surrounding a nonwoven fabric which cannot swell in the electrolyte solution, the porous film including an electrolyte solution non-swelling organic polymer with a melting point of 210° C. or above (component B) and an electrolyte solution non-swelling organic polymer with a melting point of 180° C. or below (component C), wherein component B is incorporated in the fiber composing the nonwoven fabric. The separator is highly safe and exhibits low reduction mechanical properties with respect to organic solvents.

21 Claims, No Drawings

SEPARATOR FOR LITHIUM ION SECONDARY BATTERY

CROSS-REFERENCE TO RELATED APPLICATION

This application is a continuation-in-part of application Ser. No. 09/959,538, filed Oct. 29, 2001 now U.S. Pat. No. 6,818,352.

BACKGROUND OF THE INVENTION

1. Field of the Invention

The present invention relates to a separator used in a lithium ion secondary battery.

2. Description of the Related Art

Lithium ion secondary batteries which produce an electromotive force, by lithium doping/dedoping, have come into increasing use with the advance of portable electronic devices in recent years, because of their characteristically high energy density. In order to achieve even higher performance for lithium ion secondary batteries, it has been proposed to use separators comprising organic polymers which swell in, and retain, electrolyte solutions, such as polyethylene oxide (PEO), polyacrylonitrile (PAN), polymethyl methacrylate (PMMA) or polyvinylidene fluoride (PVdF). Among these, PVdF or PVdF copolymers which are composed mainly of PVdF are considered to be most suitable from the standpoint of oxidation/reduction resistance, and some of these have been developed for practical use.

It is known that separators using such organic polymers have inadequate mechanical properties and are difficult to form into thin films, as compared with polyolefin fine porous films most commonly employed as separators. Polyolefin fine porous film reinforcement and nonwoven fabric reinforcement have been proposed as methods of reinforcement, and polyolefin porous film reinforcement is primarily used at present. On the other hand, the present inventors have found, and have disclosed in WO01/67536, that suitable control of the morphology of a separator with nonwoven fabric reinforcement can exhibit an overcharge protecting function and thereby markedly improve the safety during overcharge.

As nonwoven fabrics for reinforcement of such separators there have been proposed polyolefin-based materials (polyethylene, polypropylene) or heat-resistant materials such as aromatic polyamides, polyesters and the like. However, the mechanical properties of olefin-based nonwoven fabrics has presented a problem from the standpoint of thin film formation. It has therefore generally been considered more practical to use nonwoven fabrics composed of heat-resistant fibers of aromatic polyamides and polyesters.

Nonwoven fabrics employed for such purposes are exposed to organic solvent environments during the separator film-forming step and when incorporated into the battery and, consequently, the hitherto proposed nonwoven fabrics composed of heat-resistant fibers of aromatic polyamides and polyesters have been associated with problems because of their reduced mechanical properties in organic solvent environments, and hence unsatisfactory productivity.

As mentioned above, nonwoven fabric reinforcement can markedly improve safety during overcharge. However, an extra element is sometimes necessary to ensure safety against abnormal heat release by the battery due to various causes (nailing, external shorts, etc.). With overcharging as well, the battery can also conceivably experience abnormal heat release by Joule heat release when charging with a high current.

SUMMARY OF THE INVENTION

It is therefore one object of the present invention to provide a separator that can ensure safety in environments in which batteries may experience abnormal heat release. It is another object of the invention to prevent reduction in mechanical properties in environments with exposure to organic solvents.

In order to guarantee safety in environments that may cause abnormal heat release, it is essential to avoid meltdown of the separator and allow heat to escape, as well as to inhibit further heat release by means of a shutdown function. The present inventors accomplished the present invention upon finding that the first object stated above can be achieved by incorporating into the separator an electrolyte solution non-swelling organic polymer with a melting point of 210° C. or above, and an electrolyte solution non-swelling organic polymer with a melting point of 180° C. or below. The present inventors also accomplished the present invention upon finding that the second object stated above can be achieved by using an electrolyte solution non-swelling organic polymer with a melting point of 180° C. or below as the separator.

In other words, the present invention provides a separator, to be used for a lithium ion secondary battery that produces electromotive force by lithium doping/dedoping, the separator being composed of a porous film comprising an organic polymer (component A) which can swell in the electrolyte solution to retain it, surrounding a nonwoven fabric which cannot swell in the electrolyte solution, the porous film including an electrolyte solution non-swelling organic polymer with a melting point of 210° C. or above (component B) and an electrolyte solution non-swelling organic polymer with a melting point of 180° C. or below (component C), wherein component B is incorporated in the fiber composing the nonwoven fabric.

The present invention further encompasses the following inventions in addition to the aforementioned invention.

1. A separator according to the invention, wherein the nonwoven fabric is formed of component B and component C.

2. A separator according to 1. above, wherein the nonwoven fabric is made of fiber composed of component B and fiber composed of component C.

3. A separator according to 2. above, wherein the nonwoven fabric is a nonwoven fabric comprising an integrated laminate of a nonwoven fabric layer composed of component B and a nonwoven fabric layer composed of component C.

4. A separator according to 1. above, wherein the fiber composing the nonwoven fabric is a core-sheath fiber with component B as the core and component C as the sheath.

5. A separator according to the invention, wherein the separator contains a filler composed of component C.

6. A separator according to 5. above, wherein the filler is formed in a laminar manner on the surface of the nonwoven fabric.

7. A separator according to 5. above, wherein the filler is formed in a laminar manner on the surface of the separator.

8. A separator according to the invention, wherein component C is a polyolefin.

9. A separator according to the invention, wherein the content of component C is 5–45 wt % with respect to the separator weight.

10. A separator according to the invention, wherein component B is at least one component selected from among polyesters, aromatic polyamides and polyphenylene sulfide.

11. A separator according to 10. above, wherein component B is polyethylene terephthalate.

12. A separator according to the invention, wherein the nonwoven fabric has an average film thickness of 10–35 μm, a basis weight of 6–20 g/m$^2$, a gas permeability (JIS P8117) of no longer than 100 seconds, a MacMullin number at 25° C. of no greater than 10 and a MacMullin number × average film thickness value of no greater than 200 μm, and the separator has an average film thickness of 10–35 μm and a basis weight of 10–25 g/m$^2$.

13. A separator according to the invention, wherein component A is polyvinylidene fluoride, a polyvinylidene fluoride copolymer or a component consisting mainly thereof.

DETAILED DESCRIPTION OF THE INVENTION

The lithium ion secondary battery separator of the invention is composed of a porous film comprising an organic polymer (component A) which can swell in the electrolyte solution to retain it, surrounding a nonwoven fabric which cannot swell in the electrolyte solution, the porous film including an electrolyte solution non-swelling organic polymer with a melting point of 210° C. or above (component B) and an electrolyte solution non-swelling organic polymer with a melting point of 180° C. or below (component C), wherein component B is incorporated in the fiber composing the nonwoven fabric.

According to the invention, "a porous film surrounding the nonwoven fabric" means that the nonwoven fabric is enclosed by the porous film, and within the scope of achieving the object of the invention, it means that the nonwoven fabric surface is essentially covered by component A. Also, the electrolyte solution used according to the invention may be any conventional known one such as described, for example, in WO01/67356, wherein usually a lithium salt is dissolved in a non-aqueous solvent used for a lithium ion secondary battery.

"Electrolyte solution non-swelling" means that the nonwoven fabric of the invention experiences virtually no swelling in the electrolyte solution described above during the step of forming the separator of the invention or under the conditions of production and use of the lithium ion secondary battery.

Component A is a component which can swell in and retain the electrolyte solution. Component A may be polyvinylidene fluoride (PVdF), polyacrylonitrile (PAN), polymethyl methacrylate (PMMA), polyethylene oxide (PEO), or the like. These may also be used in admixture. Among these, PVdF or PVdF copolymers which are composed mainly of PVdF are especially suitable from the standpoint of oxidation/reduction resistance.

Component B, which is an electrolyte solution non-swelling organic polymer with a melting point of 210° C. or above may be, specifically, a polyester such as polyethylene terephthalate (PET), polybutylene terephthalate (PBT), an aromatic polyamide (aramid), polyphenylene sulfide (PPS), or the like, which may be used alone or in admixture. Among these, polyesters and aramids, and especially PET, are particularly preferred because they can adequately prevent further heat release due to internal short-circuiting caused by meltdown of the separator or heat shrinkage of the separator when the battery experiences abnormal heat release, or chemical reaction such as decomposition of the electrolyte solution caused by internal short-circuiting.

From the standpoint of preventing internal short-circuiting, the method of incorporating component B into the separator involves its incorporation as the fiber composing the nonwoven fabric which serves an important function for the thermomechanical properties of the separator.

Component C, which is an electrolyte solution non-swelling organic polymer with a melting point of 180° C. or below may be, specifically, a polyolefin such as polypropylene (PP) or polyethylene (PE), which may be used alone or in admixture. Among these, components with a melting point of 150° C. or below, and especially PE, are preferred because they exhibit an excellent effect of absorbing heat by heat of fusion and thus inhibit heat release when the battery experiences abnormal heat release, and in some cases can exhibit a shutdown function by assuming a film shape, thereby preventing further heat release by the battery.

The method of incorporating component C into the porous film is not particularly restricted and, for example, there may be conceived methods of adding fine particle or fibrous fillers, methods of incorporation into the nonwoven fabric as fiber, or methods of incorporation in a manner covering the surface of the nonwoven fabric fiber composed of component B.

When a filler is added, it may be added by a method of uniform dispersion throughout the entire porous film, or a method of segregation into portions such as the porous film surface, the layer composed of component A or the nonwoven fabric layer. The method of uniform dispersion has an advantage over the method of segregation in that ion conduction is not easily inhibited by the filler. It is therefore suitable in cases where it is desired to add a large amount of fine particulate filler composed of component C to increase its contribution to fusion heat absorption. However, when it is desired for the fine particulate filler to assume a film shape when melted in order to exhibit a shutdown function which inhibits ion conduction, this method requires addition of significantly large amounts of the particulate filler. For this reason, it may notably inhibit ion conduction to an undesirable extent.

In contrast, the method of segregation allows a shutdown function to be exhibited even with addition of a small amount of particulate filler, and it is therefore the preferred method in cases where it is desired to fabricate a separator which not only contributes to heat absorption but also exhibits a shutdown function.

The filler may used in any of a variety of different forms, such as particles. Fine particles are particularly preferred, with a fine particle size in the range of 0.1–5 μm being especially preferred.

A method of adding a fine particulate filler produces a small effect of improving the mechanical properties of the separator, but a method of incorporating component C into the nonwoven fabric provides an effect of improving the mechanical properties of the separator in addition to the effect of adding component C.

The method of incorporating component C into the nonwoven fabric may be, for example, a method in which fiber composed of component B and fiber composed of component C, or fiber wherein component C covers the surface of fiber of component B, are used to prepare a nonwoven fabric. In such cases, as binding of the fiber composed of component B is weakened in an organic solvent environment, whereas binding of component C and component B remains firm even in such an environment, the mechanical properties of the nonwoven fabric are enhanced and the separator properties are also enhanced. A separator employing such a nonwoven fabric not only exhibits enhanced mechanical properties, but also retains the effect described above.

A nonwoven fabric such as described above may be prepared simply by mixing fiber composed of component B with fiber composed of component C, but it may alternatively be prepared by using a calender to laminate a nonwoven fabric composed of component B and a nonwoven fabric composed of component C. The latter method can more easily provide a shutdown function because it allows segregation of component C.

It is also preferred to use split fiber as the fiber composed of component C, in order to more easily provide a shutdown function. Using such fiber will allow the mesh of the nonwoven fabric to be reduced, while also facilitating formation of a film with no defects in the surface when melted.

Another possible method involves coating component C onto the surface of fiber composing a nonwoven fabric composed of component B. In this case as well, binding between the fiber composed of component B is reinforced by component C, thus preventing reduced mechanical properties in an organic solvent environment. This type of nonwoven fabric can also be obtained by preparing a nonwoven fabric using fiber with component B as the core and component C as the sheath. Another possible method involves adhering fine particles composed of component C onto a nonwoven fabric composed of component B, and fusing it to form a coating on the surface of the fiber composed of component B.

The method of incorporating component C into a nonwoven fabric as the fiber and the method of adding a filler may each be employed separately or in a combined manner.

In order to achieve the effect of component C as described above, component C is preferably added at 5–45 wt % with respect to the separator weight.

In addition, by appropriately controlling the morphology of the lithium ion secondary battery separator of the invention, it is possible to impart the overcharge-preventing function described in WO01/67536. That is, such control can provide a nonwoven fabric with an average film thickness of 10–35 μm, a basis weight of 6–20 g/m$^2$, a gas permeability (JIS P8117) of no longer than 100 seconds, a MacMullin number at 25° C. of no greater than 10 and a MacMullin number × average film thickness value of no greater than 200 μm, and a separator with an average film thickness of 10–35 μm and a basis weight of 10–25 g/m$^2$. Here, the MacMullin number is the value of the ion conductance of the electrolyte solution divided by the ion conductance when the sample is impregnated with the electrolyte solution. Employing the above-mentioned morphology can realize an overcharge-preventing function as well as practical mechanical properties and ion permeability.

The separator of the invention can be obtained by impregnating and coating the nonwoven fabric obtained in the manner described above with the organic polymer solution for component A, and then removing the solvent. The specific porous film production method used here may be a method employing an aqueous coagulating bath as mentioned in WO01/67536, or a method employing a volatile solvent.

The present invention will now be explained in further detail by way of the following examples which are not intended to limit the invention.

<Method of Evaluating Shutdown Property>

A nonwoven fabric (21 mmφ) was impregnated with 1 M LiBF$_4$ EC/PC (1/1 weight ratio) as the electrolyte solution, and then sandwiched between SUS plates (20 mmφ) to fabricate an evaluation cell. The impedance of the cell after treatment for one hour at ordinary temperature and 200° C. was compared with the value at ordinary temperature in order to evaluate the shutdown property of the nonwoven fabric. The impedance was measured under conditions with an amplitude of 10 mV and a frequency of 10 kHz.

<Method of Evaluating Separator>

The separator of the invention was evaluated on the basis of the following.

(1) Heat Absorption Evaluation

The heat absorption was measured by differential scanning calorimetry (DSC) in a range of 180° C. or below. The measurement was conducted in a temperature range of 30–200° C. with a temperature elevating rate of 5° C./min. For measurement, the heat absorption per gram of separator was determined, and this was converted to the heat absorption per cm$^2$ using the basis weight.

(2) Heat Resistance Evaluation

A 21 mmφ-punched separator was impregnated with 1 M LiBF$_4$ EC/PC (1/1 weight ratio) and then sandwiched between SUS 20 mmφ electrodes to fabricate an evaluation cell. The impedance of the cell was measured by applying an alternating current with an amplitude of 10 mV and a frequency of 10 kHz at room temperature. After raising the cell temperature to 200° C., the impedance was again measured under the same conditions at room temperature. The heat resistance was evaluated to be insufficient from the standpoint of heat shrinkage and meltdown if a fall in impedance occurred before and after treatment, whereas the heat resistance was evaluated to be sufficient if no fall in impedance occurred.

(3) Battery Evaluation

A 600 mAh capacity aluminum-plastic laminated film cased battery was fabricated, and subjected to an initial charge/discharge test as a battery characteristic test and to an external short-circuiting test and overcharge test as safety tests.

A. Electrodes

The electrodes of the battery used for evaluation were fabricated in the following manner.

(Positive Electrode)

A positive electrode agent paste was prepared containing 89.5 parts by weight of lithium cobaltate (LiCoO$_2$: product of Nippon Chemical Industry Co., Ltd.) powder, 4.5 parts by weight of acetylene black (Denki Kagaku Kogyo, KK.) and 6 parts by dry weight of PVdF (Kureha Chemical Industry Co., Ltd.) using NMP as the solvent. The paste was coated onto aluminum foil (20 μm thickness) and then dried and pressed to obtain a positive electrode with a thickness of 97 μm.

(Negative Electrode)

A negative electrode agent paste was prepared containing 87 parts by weight of mesophase carbon microbeads (MCMB: product of Osaka Gas & Chemical Co., Ltd.) powder, 3 parts by weight of acetylene black (Denki Kagaku Kogyo, KK.) and 10 parts by dry weight of PVdF (Kureha Chemical Industry Co., Ltd.) using NMP as the solvent. The paste was coated onto a copper foil (18 μm thickness) and then dried and pressed to obtain a negative electrode with a thickness of 90 μm.

B. Test Conditions

The tests were carried out under the following conditions, at an ambient temperature of 25° C.

(Initial Charge/Discharge Test)

Constant current/constant voltage charging (8 hour) at 0.2 C, 4.2 V was followed by constant current discharge at 0.2 C, 2.75 V cutoff, and acceptability was judged upon confirming the prescribed capacity.

(External Short-Circuiting Test)

The cell was fully charged by constant current/constant voltage charging at 0.2 C, 4.2 V. The positive electrode and negative electrode of the charged battery were externally short-circuited, and acceptability was judged upon confirming the absence of rupture or fire of the battery.

(Overcharge Test)

A fully discharged battery was charged for 5 hours with constant current charging of 1 C. Acceptability was judged upon confirming the absence of rupture or fire of the battery.

(4) Puncture Strength Measurement Method

A nonwoven fabric or separator sample was set in a 11.3 mmφ fixed frame, a needle with a 0.5 mm tip radius was vertically stuck into the center of the sample, the needle was pushed inward at a fixed speed of 50 mm/min, and the puncture strength was recorded as the load on the needle at the point where a hole opened in the sample.

In the following reference examples, nonwoven fabrics were fabricated and their shutdown properties evaluated.

REFERENCE EXAMPLE 1

Using PET fiber with a fineness of 0.33 dtex (product of Teijin Ltd.) as the main fiber and binder PET fiber with a fineness of 0.22 dtex (product of Teijin Ltd.) as the binder fiber, the main fiber and binder fiber were mixed in a weight ratio of 1:1, and a wet sheeting method was used to fabricate a nonwoven fabric with an average thickness of 15.1 μm and a basis weight of 10.0 g/m$^2$. The properties of the nonwoven fabric were as follows.

Gas permeability: <1 sec
MacMullin No.: 4.2
MacMullin No. x thickness: 63 μm.

An aqueous dispersed slurry of PE fine particles with a particle size of 0.6 μm (product name: Chemiperl W4005, product of Mitsui Chemical Co., Ltd.) was diluted to 75 vol % with purified water and the prepared slurry was impregnated and coated onto the aforementioned nonwoven fabric and then pressed with a roller, after which it was dried at 80° C., thus attaching the PE fine particles onto the nonwoven fabric at 5.8 g/m$^2$. The impedance of the nonwoven fabric was approximately 10-fold.

REFERENCE EXAMPLE 2

Using PET fiber with a fineness of 0.11 dtex (product of Teijin Ltd.) as the main fiber and core/sheath fiber with a fineness of 0.77 dtex comprising PP as the core section and PE as the sheath section (product of Daiwabo Co., Ltd.) as the binder fiber, the main fiber and binder fiber were mixed in a weight ratio of 1:1, and a wet sheeting method was used to fabricate a nonwoven fabric with an average thickness of 100 μm and a basis weight of 50.0 g/m$^2$.

The impedance of the nonwoven fabric was approximately 45-fold.

REFERENCE EXAMPLE 3

Meta-aramid fiber with a fineness of 0.9 dtex (product of Teijin Ltd.) was used as the main fiber. As the binder fiber there was used a core-sheath fiber with a fineness of 0.77 dtex comprising PP as the core section and PE as the sheath section (product of Daiwabo Co., Ltd.). The main fiber and binder fiber were mixed in a weight ratio of 1:1, and a wet sheeting method was used to fabricate a nonwoven fabric with an average thickness of 105 μm and a basis weight of 50.0 g/m$^2$. The impedance of the nonwoven fabric was approximately 40-fold.

REFERENCE EXAMPLE 4

A PP fine porous film (product name: CELGARD #2400, product of Celgard Co.) was used for evaluation of the shutdown properties in the same manner as Reference Example 1. As a result, the impedance was reduced instead of increased. The evaluated cell was decomposed and observed, showing shrinkage and melting of the PP fine porous film and short-circuiting of the electrodes.

REFERENCE EXAMPLE 5

Using PET fiber with a fineness of 0.11 dtex (product of Teijin Ltd.) as the main fiber and PET fiber with a fineness of 1.21 dtex (product of Teijin Ltd.) as the binder fiber, the main fiber and binder fiber were mixed in a weight ratio of 6:4, and a wet sheeting method was used to fabricate a nonwoven fabric with an average thickness of 97 μm and a basis weight of 50.0 g/m$^2$.

When the shutdown property of the nonwoven fabric was evaluated, no significant increase or decrease in impedance was found.

REFERENCE EXAMPLE 6

Using a core-sheath fiber with a fineness of 0.77 dtex comprising PP as the core section and PE as the sheath section (product of Daiwabo Co., Ltd.), a wet sheeting method was used to fabricate a nonwoven fabric with an average thickness of 110 μm and a basis weight of 50.0 g/m$^2$.

When the shutdown property of the nonwoven fabric was evaluated, no measurement was possible due to shrinkage and melting after heat treatment.

These results demonstrate that a nonwoven fabric comprising an electrolyte solution non-swelling organic polymer with a melting point of 210° C. or above (component B) and an electrolyte solution non-swelling organic polymer with a melting point of 180° C. or below (component C), exhibits an excellent shutdown property and can thus prevent meltdown even at high temperatures.

<Fabrication and Evaluation of Separator>

EXAMPLE 1

A PVdF copolymer composed of vinylidene fluoride:hexafluoropropylene:chlorotrifluoroethylene=92.2:4.4:3.4 (weight ratio) with a weight-average molecular weight Mw of 410,000 was dissolved in a mixed solvent containing N,N-dimethylacetamide (DMAc) and tripropylene glycol (TPG) in a weight ratio of 7/3 at 60° C., to prepare a film-forming dope (a copolymer solution) with a copolymer concentration of 12 wt %. The obtained dope was used for impregnation and coating of the PE fine particle-attached nonwoven fabric formed in Reference Example 1, and then the fabric was immersed in an aqueous solution with a solvent concentration of 50 wt %, coagulated and then washed and dried to obtain a separator for a lithium ion secondary battery. The average thickness of the separator was 24.3 μm and the basis weight was 21.2 g/m². The evaluation results for the separator are shown in Table 1.

EXAMPLE 2

A lithium ion secondary battery separator comprising PET as both the main fiber and the binder fiber was fabricated in the same manner as Example 1, except that the nonwoven fabric in Example 1 was not coated with PE fine particles.

After then drying the PE fine particle aqueous dispersed slurry used in Example 1, methanol was added for redispersion of the PE fine particles to obtain a PE fine particle methanol-dispersed slurry. The slurry was coated and dried onto the surface of the lithium ion secondary battery separator to attach the PE fine particles onto the separator surface, thus obtaining a lithium ion secondary battery separator according to the invention.

The average thickness of the obtained separator was 24.5 μm, the basis weight was 20.5 g/m², and the PE fine particle coverage was 5.1 g/m². The evaluation results for the separator are shown in Table 1.

EXAMPLE 3

The same nonwoven fabric was used as in Example 1. The PE fine particle aqueous dispersed slurry used in Example 1 was dried to obtain PE fine particles. The PE fine particles were dispersed in the same type of film-forming dope as Example 1 in an amount equivalent to the PVdF copolymer, to obtain a film-forming dope. The dope was used to fabricate a lithium ion secondary battery separator in the same manner as Example 1. The average thickness of the obtained separator was 25.6 μm, the basis weight was 21.5 g/m², and the PE fine particle coverage was 6.1 g/m². The evaluation results for the separator are shown in Table 1.

EXAMPLE 4

Using PET fiber with a fineness of 0.11 dtex (product of Teijin Ltd.) as the main fiber and core/sheath fiber with a fineness of 0.77 dtex comprising PP as the core section and PE as the sheath section (product of Daiwabo Co., Ltd.) as the binder fiber, the main fiber and binder fiber were mixed in a weight ratio of 1:1, and a wet sheeting method was used to fabricate a nonwoven fabric. The properties of the nonwoven fabric were as follows.

Average thickness: 20.1 μm
Basis weight: 12.0 g/m²
Gas permeability: <1 sec
MacMullin No.: 9.6
MacMullin No. x thickness: 193 μm.

After impregnating this nonwoven fabric with the same type of film-forming dope as in Example 1, it was immersed in an aqueous solution with a solvent concentration of 50 wt % for coagulation, and then washed and dried to obtain a separator for a lithium ion secondary battery. The average thickness of the obtained separator was 24.7 μm and the basis weight was 17.6 g/m². The evaluation results for the separator are shown in Table 1.

Measurement of the normalized puncture strength of the nonwoven fabric and separator gave a result of 157 g for the nonwoven fabric and 239 g for the separator. The polyolefin amount was 6 g/m².

EXAMPLE 5

A nonwoven fabric was fabricated by a wet sheeting method using a 1.65 dtex core-sheath fiber with PET as the core and PE as the sheath (product of Teijin Ltd.). The properties of the nonwoven fabric were as follows.

Average thickness: 29.6 μm
Basis weight: 10 g/m²
Gas permeability: <1 sec
MacMullin No.: 3.8
MacMullin No. x thickness: 112 μm.

The nonwoven fabric was used to obtain a separator for a lithium ion secondary battery by the same method as Example 4. The average thickness of the obtained separator was 34.5 μm and the basis weight was 16.5 g/m². The evaluation results for the separator are shown in Table 1. The polyolefin amount was 1 g/m².

TABLE 1

| | | | Battery evaluation | | |
| --- | --- | --- | --- | --- | --- |
| Separator | Heat absorption J/cm² | Heat resistance | Initial charge/ discharge test | External short- circuiting test | Over- charging test |
| Example 1 | $5.1 \times 10^{-2}$ | adequate | ◯ | ◯ | ◯ |
| Example 2 | $4.5 \times 10^{-2}$ | adequate | ◯ | ◯ | ◯ |
| Example 3 | $5.4 \times 10^{-2}$ | adequate | ◯ | ◯ | ◯ |
| Example 4 | $6.8 \times 10^{-2}$ | adequate | ◯ | ◯ | ◯ |
| Example 5 | $3.1 \times 10^{-2}$ | adequate | ◯ | ◯ | ◯ |

Note:
◯ = acceptable

The results for Examples 1–5 shown in Table 1 demonstrate that using a lithium ion secondary battery separator according to the invention markedly improves the safety of the lithium ion secondary battery.

<Separator Physical Property Evaluation>

EXAMPLE 6

Using PET fiber with a fineness of 0.11 dtex (product of Teijin Ltd.) as the main fiber and core/sheath fiber with a fineness of 1.65 dtex comprising PET as the core section and PE as the sheath section, as the binder fiber, the main fiber and binder fiber were mixed in a weight ratio of 1:1, and a wet sheeting method was used to fabricate a nonwoven fabric. The thickness of the nonwoven fabric was 16.8 μm and the basis weight was 12.0 g/m².

The nonwoven fabric was used to obtain a separator for a lithium ion secondary battery by the same method as Example 4. The separator thickness was 27.6 μm and the basis weight was 19.2 g/m². The polyolefin amount was 1.2 g/m².

Measurement of the puncture strength of the nonwoven fabric and lithium ion secondary battery separator gave a result of 155 g for the nonwoven fabric and 243 g for the lithium ion secondary battery separator.

These results demonstrate that binding of the nonwoven fabric is reinforced by the construction of the invention, and that the reduction in puncture strength is minimal even in environments with exposure to organic solvents, such as during film-forming steps.

As explained above, using a lithium ion secondary battery separator according to the invention can ensure safety in environments and during overcharging, in which the battery may experience abnormal heat release, and can thereby provide a lithium ion secondary battery with markedly excellent safety compared to the prior art. A lithium ion secondary battery separator having a construction according to the invention also exhibits vastly enhanced mechanical properties particularly in environments with exposure to organic solvents, and therefore lithium ion secondary battery separators according to the invention have an effect of preventing complications such as micro short-circuiting and accompanying self-discharge, thus providing lithium ion secondary batteries with higher reliability.

What we claim is:

1. A separator, used for a lithium ion secondary battery that produces electromotive force by lithium doping/dedoping, said separator
    being composed of a porous film comprising an organic polymer (component A) which can swell in an electrolyte solution to retain the electrolyte solution, surrounding a nonwoven fabric which cannot swell in the electrolyte solution, said porous film including an electrolyte solution non-swelling organic polymer with a melting point of 210° C. or above (component B) and an electrolyte solution non-swelling organic polymer with a melting point of 180° C. or below (component C),
    wherein component B is incorporated in the fiber composing the nonwoven fabric,
    wherein said nonwoven fabric is a nonwoven fabric formed of component B and component C, and
    wherein the fiber composing said nonwoven fabric is a core-sheath fiber with component B as the core and component C as the sheath.

2. The separator according to claim 1, wherein component C is a polyolefin.

3. The separator according to claim 1, wherein the content of component C is 5–45 wt % with respect to the separator weight.

4. The separator according to claim 1, wherein component B is at least one component selected from the group consisting of polyesters, aromatic polyamides and polyphenylene sulfide.

5. The separator according to claim 4, wherein component B is polyethylene terephthalate.

6. The separator according to claim 1, wherein said nonwoven fabric has an average film thickness of 10–35 μm, a basis weight of 6–20 g/m², a gas permeability (JIS P8117) of no longer than 100 seconds, a MacMullin number at 250° C. of no greater than 10 and a MacMullin number x average film thickness value of no greater than 200 μm, and said separator has an average film thickness of 10–35 μm and a basis weight of 10–25 g/m².

7. The separator according to claim 1, wherein component A is polyvinylidene fluoride, a polyvinylidene fluoride copolymer or a component consisting mainly thereof.

8. A separator, used for a lithium ion secondary battery that produces electromotive force by lithium doping/dedoping, said separator
    being composed a porous film comprising an organic polymer (component A) which can swell in an electrolyte solution to retain the electrolyte solution, surrounding a nonwoven fabric which cannot swell in the electrolyte solution, said porous film including an electrolyte solution non-swelling organic polymer with a melting point of 210° C. or above (component B) and an electrolyte solution non-swelling organic polymer with a melting point of 180° C. or below (component C),
    wherein component B is incorporated in the fiber composing the nonwoven fabric, and
    wherein said separator contains a filler composed of component C.

9. The separator according to claim 8, wherein said filler is attached in a laminar manner to the surface of said nonwoven fabric.

10. The separator according to claim 8, wherein said filler is formed in a laminar manner on the surface of said separator.

11. The separator according to claim 8, wherein component C is a polyolefin.

12. The separator according to claim 8, wherein the content of component C is 5–45 wt % with respect to the separator weight.

13. The separator according to claim 8, wherein component B is at least one component selected from the group consisting of polyesters, aromatic polyamides and polyphenylene sulfide.

14. The separator according to claim 13, wherein component B is polyethylene terephthalate.

15. The separator according to claim 8, wherein said nonwoven fabric has an average film thickness of 10–35 μm, a basis weight of 6–20 g/m², a gas permeability (JIS P8117) of no longer than 100 seconds, a MacMullin number at 25° C. of no greater than 10, and a MacMullin number x average film thickness value of no greater than 200 μm, and said separator has an average film thickness of 10–35 μm and a basis weight of 10–25 g/m².

16. The separator according to claim 8, wherein component A is polyvinylidene fluoride, a polyvinylidene fluoride copolymer or a component consisting mainly thereof.

17. The separator according to claim 1, wherein said nonwoven fabric further comprises a fiber of polyethylene terephthalate.

18. The separator according to claim 17, wherein component C is a polyolefin.

19. The separator according to claim 17, wherein the content of component C is 5–45 wt % with respect to the separator weight.

20. The separator according to claim 17, wherein said nonwoven fabric has an average film thickness of 10–35 μm, a basis weight of 6–20 g/m², a gas permeability (JIS P8117) of no longer than 100 seconds, a MacMullin number at 25° C. of no greater than 10 and a MacMullin number x average film thickness value of no greater than 200 μm, and said separator has an average film thickness of 10–35 μm and a basis weight of 10–25 g/m².

21. The separator according to claim 17, wherein component A is polyvinylidene fluoride, a polyvinylidene fluoride copolymer or a component consisting mainly thereof.

* * * * *